April 28, 1936.  G. LUFKIN  2,038,797
GLASS FURNACE
Filed April 16, 1934  3 Sheets-Sheet 1
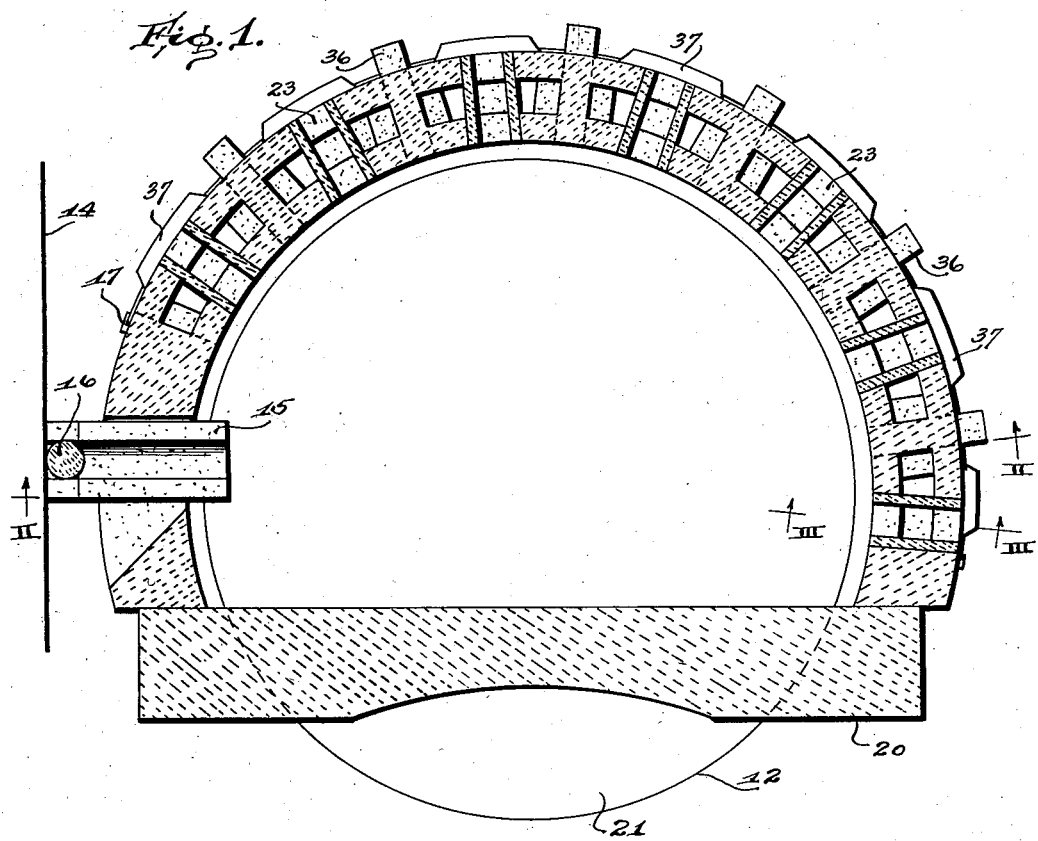
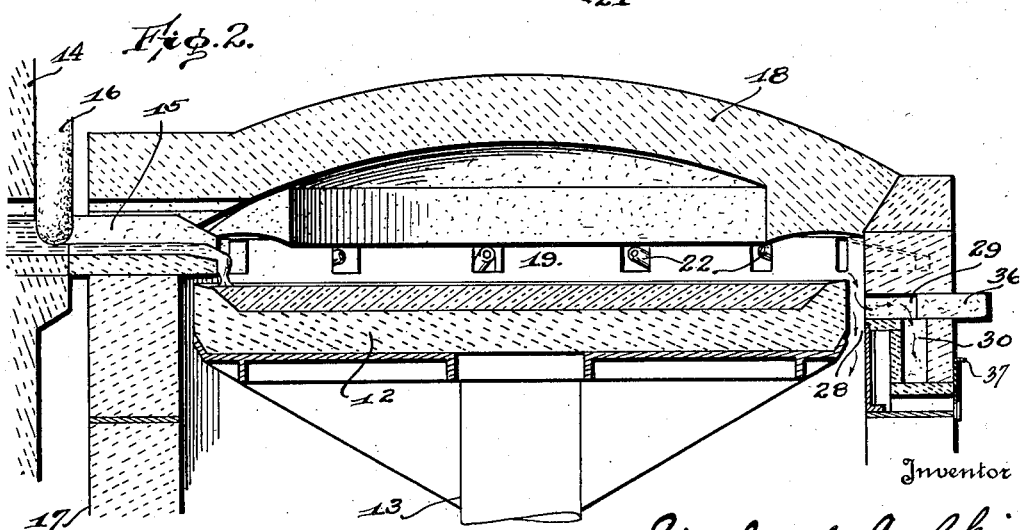
Inventor
Garland Lufkin
By J. F. Rule,
Attorney April 28, 1936.  G. LUFKIN  2,038,797
GLASS FURNACE
Filed April 16, 1934   3 Sheets-Sheet 2
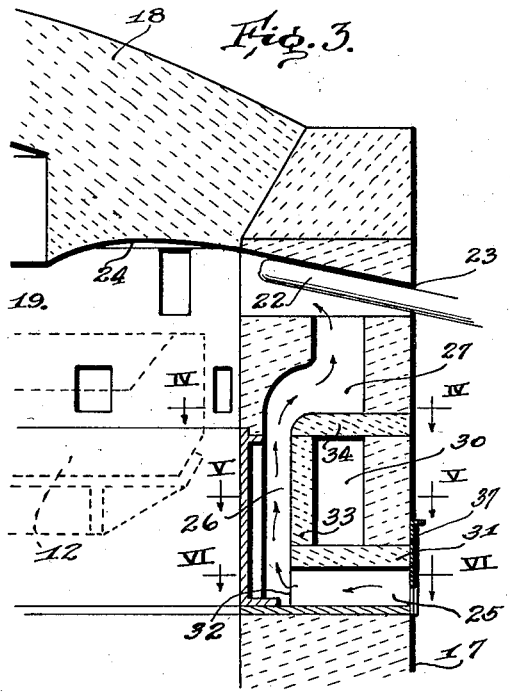
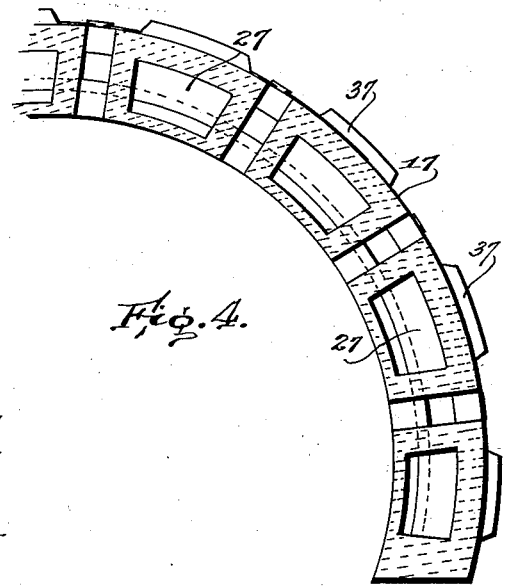
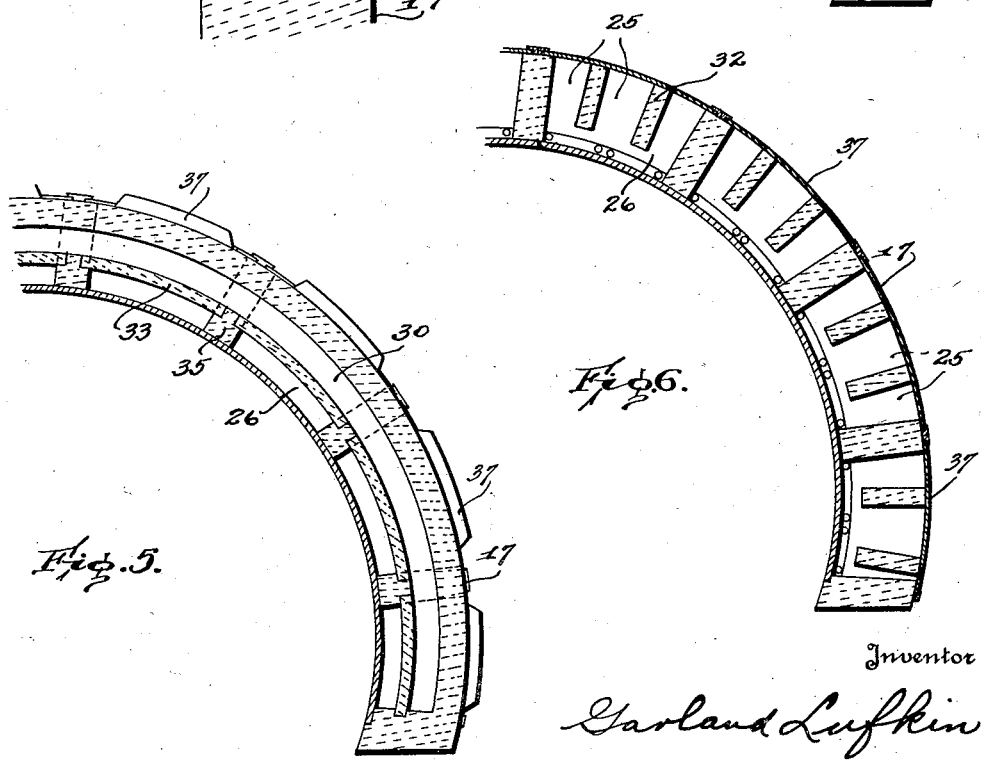
Inventor
Garland Lufkin
By J. F. Rule, Attorney April 28, 1936.  G. LUFKIN  2,038,797
GLASS FURNACE
Filed April 16, 1934     3 Sheets-Sheet 3
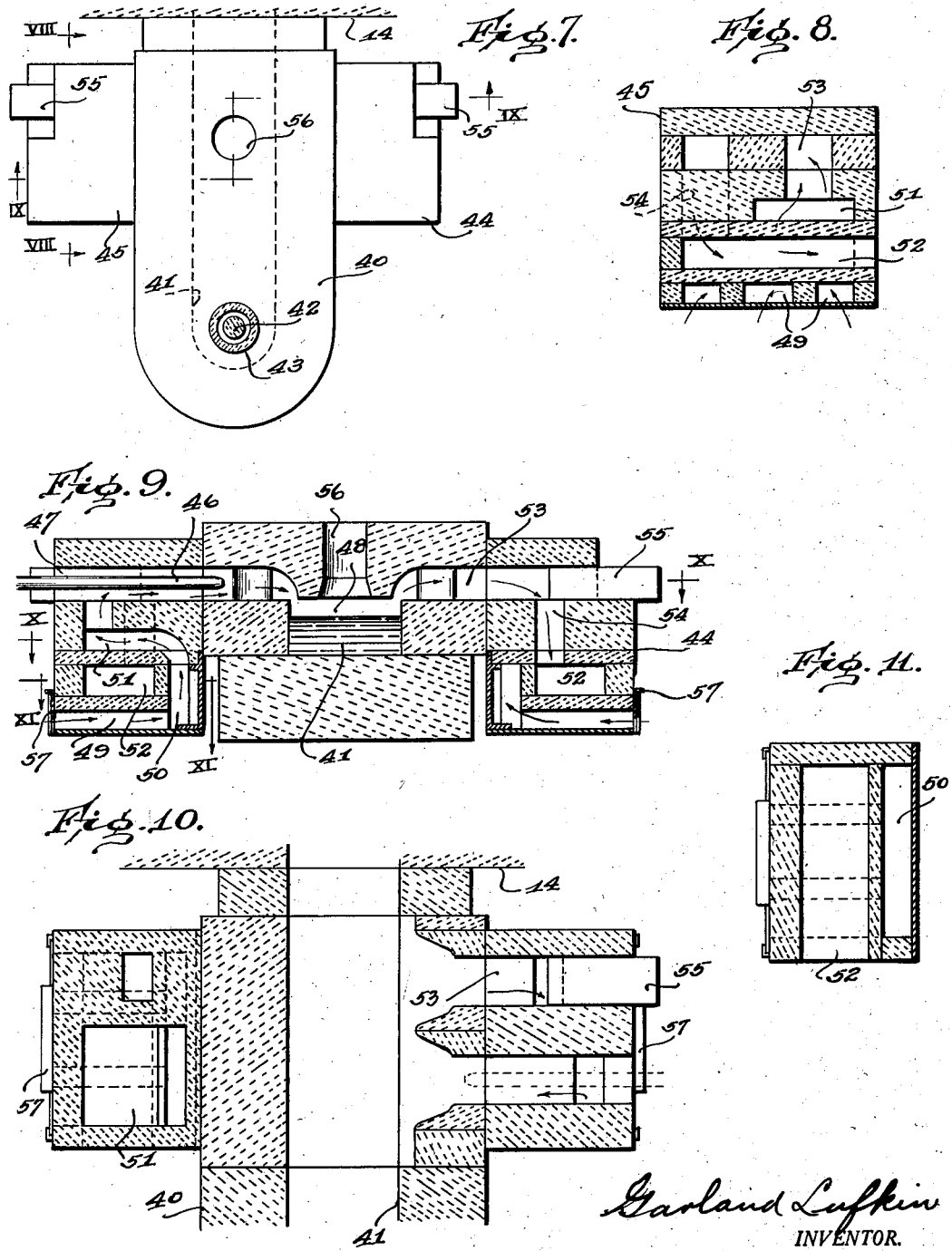

Patented Apr. 28, 1936

2,038,797

UNITED STATES PATENT OFFICE 2,038,797

GLASS FURNACE

Garland Lufkin, Bridgeton, N. J., assignor to Owens-Illinois Glass Company, a corporation of Ohio Application April 16, 1934, Serial No. 720,703

14 Claims. (Cl. 49—56)

My invention relates to glass furnace equipment including containers from which molten glass is withdrawn for making various kinds of glassware. More specifically, the invention pertains to means for supplying heat to glass in the containers, and to means by which the heat is distributed, regulated and controlled.

One form of the invention is particularly adapted for use in connection with revolving pots or tanks such as are commonly used to supply molten glass to molds of the suction gathering type. Such revolving pots are ordinarily mounted beneath a stationary arched roof providing a heat chamber over the pot. Burners supply heat to said chamber for maintaining the glass at the required high temperature. Difficulty is often experienced with revolving pots on account of the glass near the rim of the pot cooling to a greater degree than that near the center thereof so that the temperature is not uniform throughout the gathering area. Moreover, the operation of gathering charges of glass into comparatively cold molds which dip into the glass, tends to introduce air bubbles and also chilled portions of glass into the tank, and particularly so near the rim thereof.

An object of the present invention is to provide in the roof over the pot a reflecting surface so arranged that radiant heat from the burners is reflected and concentrated on the zone of glass adjacent the rim of the pot. The invention further aims to provide for a uniform distribution of the heat from the burners over the entire surface area of the glass in the pot.

A further object of the invention is to provide positive and reliable means for maintaining the rim of the pot at the required high temperature, by drawing all of the waste gases of combustion over and around said rim.

A further object of the invention is to utilize a substantial portion of the heat which in conventional constructions is lost in the waste gases which are discharged over the rim of the pot to the atmosphere.

A further object of the invention is to provide a compact, efficient and practical recuperator construction combined with and forming a part of the furnace wall which surrounds the revolving pot.

Other objects of the invention will appear hereinafter.

Referring to the accompanying drawings:

Fig. 1 is a sectional plan view of a construction embodying the present invention as used in connection with a revolving pot.

Fig. 2 is a sectional elevation at the line II—II on Fig. 1.

Fig. 3 is a sectional elevation at the line III—III on Fig. 1.

Figs. 4, 5 and 6 are fragmentary sectional plan views at the lines IV—IV, V—V and VI—VI, respectively, on Fig. 3.

Figs. 7 to 11, inclusive, illustrate a modified construction in which the invention is applied to a stationary furnace extension or forebay. Fig. 7 is a plan view thereof. Fig. 8 is a section through one of the recuperators, the section being taken at the line VIII—VIII on Fig. 7. Fig. 9 is a sectional elevation at the line IX—IX on Fig. 7. Fig. 10 is a sectional plan view at the line X—X on Fig. 9. Fig. 11 is a sectional plan at the line XI—XI on Fig. 9.

Referring particularly to Figs. 1 to 6, a circular pot or tank 12 which may be of conventional construction is mounted on a center column 13 and rotated therewith continuously about the vertical axis of said column. A glass melting and refining tank 14 supplies a continuous stream of glass through a trough 15 to the pot, the rate of flow being regulated by a vertically adjustable plug 16. The pot is partly surrounded and enclosed by a vertical wall 17 which supports an arched roof or dome 18 covering the major portion of the pot and providing a heat chamber 19 over the glass within the pot. A front wall 20 is located over the pot and extends thereacross in position to provide the usual exposed gathering area 21, the wall 20 providing the usual jack arch. Suction gathering molds (not shown) traveling across the area 21, dip into the glass and gather their charges by suction A series of burners 22 positioned at intervals along the wall 17 project into or through openings 23 formed in the wall near the dome or roof 18. The latter is formed with a reflecting surface 24 just inside the vertical arc-shaped wall 17. The surface 24 overlies and is spaced above the rim of the revolving pot. Said surface may extend circumferentially of the roof 18 from one end to the other of the front wall 20, said reflecting surface 24 forming the marginal portion of the interior surface of the roof 18. The surface 24, as shown in cross-section, is concave.

The burners 23 direct their flames in an upwardly and inwardly inclined direction against the reflecting surface 24 and the radiant heat is reflected downwardly from said surface to the glass in the pot therebeneath. The arrangement is such that the heat is applied mainly to that portion of the glass near the rim of the pot and thus assists in remelting and reheating the portions of the glass chilled by the molds and by exposure to the air, and also assists in maintaining the glass entering the gathering area at the required temperature. The reflecting surfaces 24 further assist in effecting a uniform distribution of the heating flames over the entire surface of the glass in the pot.

The wall 17 is constructed to provide a recuperator by which a portion of the gases of combustion from the heat chamber 19 are utilized for heating the air supplied to the burners 22. In accordance with this construction, the air supplied to the burners is introduced through a series of intake passageways 25 extending horizontally inward to vertical channels 26 which open into air chambers 27. The chambers 27 open upwardly into the burner ports 23. The waste gases of combustion pass from the heating chamber 19 over the rim of the pot to the narrow passageway 28 between the rim of the pot and the surrounding wall 17. A portion of the exhaust gases entering the passageway 28, flows downward therethrough and is discharged directly into the atmosphere beneath the pot. Another portion of the exhaust gases enters horizontal ducts 29 extending outwardly through the wall 17, said ducts opening into a waste gas chamber 30 common to all of the ducts 29. The chamber 30 as shown extends nearly the full length of the wall 17. The lower horizontal wall 31 of the chamber 30 may be supported on vertical blocks 32 (Figs. 3 and 6). The inner vertical wall 33 of the chamber 30 separates said chamber from the vertical ducts 26 through which the fresh air passes. Horizontal blocks 34 form the roof of the chamber 30 and separate it from the fresh air chambers 27. The ducts or passageways 26 which are individual to the burners 22, are separated by vertical blocks 35. It will be observed that the fresh air entering through the ports 25 flows in contact with the bottom, top and inner side walls of the chamber 30 through which the hot waste gases are discharged. A large area of the chamber walls is thus presented to the inflowing air, so that a considerable amount of heat from the waste gases is transmitted through said walls and utilized for heating the air supplied to the burners. The proportion of the spent gases entering the chamber 30 is adjustably controlled and regulated by valve blocks 36 (Figs. 1 and 2) which project into the channels 29 and are adjustable therein to throttle the entrance to the waste gas chamber 30 to any desired extent. The amount of air supplied through the recuperator to the burners is adjustably controlled by dampers 37 for the ports 25.

Figs. 7 to 11, inclusive, illustrate a modification in which the invention is adapted for use with a stationary container from which the molten glass is withdrawn. In this construction, the furnace 14 is provided with a forehearth extension or boot 40 providing a basin or channel 41 into which the glass flows from the furnace. This channel may be provided, as usual, with a bottom outlet opening at the forward end thereof through which the glass is discharged under the control of a vertically reciprocating plunger 42. The usual rotating sleeve 43 surrounding the plunger may be provided as shown.

Recuperators 44 and 45 are located on opposite sides of the boot 40, said recuperators being similar in construction, except that they are built right and left handed, respectively. Burners 46 project into or through horizontal channels 47 extending through the recuperators adjacent the upper forward corners thereof, said channels being continued through the side walls of the container 40, and opening into the heat chamber 48 over the glass in the channel 41.

Fresh air is supplied to each burner through a passageway comprising horizontal ducts 49, a vertical duct 50 and horizontal ducts 51, the latter opening upwardly into the channel 47. This air line extends along the bottom, side and top walls of the chamber 52 into and through which the waste gases of combustion are discharged. These waste gases pass from the heat chamber 48 through horizontal ducts 53 to vertical ducts 54 extending downwardly from the ducts 53 and opening into the chamber or passageway 52, the latter extending horizontally substantially the full length of the recuperator and opening at the forward end thereof to the outside air. A valve block 55 is adjustable in the duct 53 to regulate the width of the entrance to the vertical duct 54 and thereby adjustably regulate the flow of waste gases from the heat chamber 48. A portion of these gases may be discharged from the chamber 48 directly through an opening 56 in the roof of said chamber. The rate at which fresh air is admitted to the recuperators through the ports 49 is adjustably controlled by dampers 57.

Modifications may be resorted to within the spirit and scope of my invention.

I claim:

1. The combination of a pot to contain molten glass, means providing a heat chamber over the pot including a roof and a wall extending along the rim of the pot, the roof having a heat radiating surface extending along the marginal portion thereof and facing downward, said surface overlying and spaced above the rim of the pot and being radially convex.

2. The combination of a pot to contain molten glass, means providing a heat chamber over the pot including a roof and a wall extending along the rim of the pot, the roof having a heat radiating surface extending along the marginal portion thereof and facing downward, said surface overlying and spaced above the rim of the pot and being radially convex, and burners arranged at intervals along the side wall of the chamber and arranged to direct heating flames against said surface.

3. The combination of a circular pot to contain molten glass, said pot rotatable about a vertical axis, means providing a heat chamber over the pot including a stationary vertical wall extending along the rim of the pot, and a dome forming a roof for said chamber, said roof being formed with a downwardly facing reflecting surface extending inwardly from the said vertical wall and forming the marginal portion of the under surface of the roof, said reflecting surface being convex in cross section radially of the pot.

4. The combination of a circular pot to contain molten glass, said pot rotatable about a vertical axis, means providing a heat chamber over the pot including a stationary vertical wall extending along the rim of the pot, a dome forming a roof for said chamber, said roof being formed with downwardly facing reflecting surface extending inwardly from the said vertical wall and forming the marginal portion of the under surface of the roof, said reflecting surface being convex in cross section radially of the pot, and burners positioned at intervals along said vertical wall, the latter provided with openings extending therethrough to receive the burners.

5. The combination of a circular pot to contain molten glass, said pot rotatable about a vertical axis, means providing a heat chamber over the pot including a stationary vertical wall extending along the rim of the pot, a dome forming a roof for said chamber, said roof being formed with a downwardly facing reflecting surface extending inwardly from the said vertical wall and forming the marginal portion of the under surface of the roof, said reflecting surface being convex in cross section radially of the pot, and burners positioned at intervals along said vertical wall, the latter provided with openings extending therethrough to receive the burners, said burners being upwardly and inwardly inclined in a direction to project burning gases against said reflecting surface and cause the latter to radiate heat downwardly along the marginal portion of the revolving pot.

6. The combination of a circular pot to contain molten glass, said pot rotatable about a vertical axis, means providing a heat chamber over the pot including a stationary vertical wall extending along the rim of the pot, a dome forming a roof for said chamber, said roof being formed with a downwardly facing reflecting surface extending inwardly from the said vertical wall and forming the marginal portion of the under surface of the roof, said reflecting surface being convex in cross section radially of the pot, and burners positioned at intervals along said vertical wall, the wall being provided with fresh air channels extending therethrough to the burners, and a waste gas channel through which spent gases are discharged from the heat chamber, said fresh air channels and waste gas channel being arranged closely adjacent each other whereby heat is transmitted from the waste gases to the air passing through said fresh air channels.

7. The combination of a rotating pot to contain molten glass, means providing a heat chamber over the pot including a stationary vertical wall extending along the margin of the pot, and a roof, burners supplying heat to said chamber, and a recuperator built into said vertical wall below the level of the rim of the pot and providing means for heating air supplied to the burners.

8. The combination of a rotating pot to contain molten glass, means providing a heat chamber over the pot including a stationary vertical wall extending along the margin of the pot, and a roof, burners supplying heat to said chamber, and a recuperator built into said vertical wall and having intake openings below the level of the rim of the pot, said wall and intake openings being so arranged that spent gases of combustion are directed downward over the rim of the pot to said intake openings, said recuperator comprising means for transferring heat from the spent gases of combustion to the fresh air supplied to the burners.

9. The combination of a rotating pot to contain molten glass, means providing a heat chamber over the pot including a stationary vertical wall extending along the margin of the pot, and a roof, burners supplying heat to said chamber, a recuperator built into said vertical wall and having intake openings below the level of the rim of the pot, said wall and intake openings being so arranged that spent gases of combustion are directed downward over the rim of the pot to said intake openings, said recuperator comprising means for transferring heat from the spent gases of combustion to the fresh air supplied to the burners, and means for adjustably regulating the volume of fresh air and/or spent gases passing through the recuperator.

10. The combination of a horizontally rotating pot to contain molten glass, a stationary housing enclosing a portion of the pot, said housing comprising a vertically disposed wall extending along the rim of the pot and spaced outwardly therefrom to provide a channel between the wall and pot, said housing including a roof spaced above the pot to provide a heat chamber, burners arranged to direct burning gases into said heat chamber, said vertical wall being provided with passageways arranged at intervals along said channel and opening into the channel below the rim of the pot, through which passageways a portion of the spent gases are discharged from the heat chamber, and valve mechanism for adjustably regulating and controlling the volume of flow through said passageways, the remaining portion of the spent gases being discharged downwardly through said channel between the rim of the pot and said vertical wall.

11. The combination of a horizontally rotating pot to contain molten glass, a stationary housing for the pot comprising a recuperator extending along the rim of the pot and spaced outwardly therefrom to provide a channel between said rim and recuperator wall, means combined with said recuperator to provide a heat chamber over the pot, and burners arranged to supply heat to said chamber, said recuperator comprising exhaust ports opening into the interior of the recuperator wall along the said channel, whereby spent gases from the heat chamber are caused to flow over the rim of the pot to said exhaust ports.

12. The combination of a horizontally rotating pot to contain molten glass, a stationary housing for the pot comprising a recuperator extending along the rim of the pot and spaced outwardly therefrom to provide a channel between said rim and recuperator wall, means combined with said recuperator to provide a heat chamber over the pot, burners arranged to supply heat to said chamber, said recuperator comprising exhaust ports opening into the interior of the recuperator wall along the said channel, whereby spent gases from the heat chamber are caused to flow over the rim of the pot to said exhaust ports, and valves adjustably controlling the amount of gases entering said exhaust ports, thereby restricting the flow through said ports and causing the remaining portion of the spent gases to be discharged downwardly between said housing and the rim of the pot directly to the atmosphere.

13. The combination of a horizontally rotating pot to contain molten glass, a stationary housing enclosing a portion of the pot and providing a heat chamber over the glass in the pot, and burners arranged to direct burning gases into said heat chamber, said housing comprising a vertically disposed wall extending along the rim of the pot and spaced outwardly therefrom to provide a channel between the wall and the pot through which spent gases of combustion are discharged from the heat chamber, said vertical wall being provided with passageways opening into said channel below the rim of the pot through which spent gases are discharged from said channel.

14. The combination of a horizontally rotating pot to contain molten glass, a stationary housing enclosing a portion of the pot and providing a heat chamber over the glass in the pot, and burners arranged to direct burning gases into said heat chamber, said housing comprising a vertically disposed wall extending along the rim of the pot and spaced outwardly therefrom to provide a channel between the wall and the pot through which spent gases of combustion are discharged from the heat chamber, said vertical wall being provided with passageways through which spent gases are discharged from the heat chamber, said passageways having their inlet openings in said channel below the rim of the pot.

GARLAND LUFKIN.